United States Patent
Tanaka et al.

(10) Patent No.: US 9,291,769 B2
(45) Date of Patent: Mar. 22, 2016

(54) COLORED OPTICAL FIBER, OPTICAL FIBER RIBBON AND OPTICAL FIBER CABLE, USING COLORED OPTICAL FIBER

(71) Applicant: FURUKAWA ELECTRIC CO., LTD., Tokyo (JP)

(72) Inventors: Hiroki Tanaka, Tokyo (JP); Minoru Saito, Tokyo (JP); Minoru Kasahara, Tokyo (JP); Yasuo Nakajima, Tokyo (JP); Yoshihiro Arashitani, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 14/309,380

(22) Filed: Jun. 19, 2014

(65) Prior Publication Data

US 2014/0301704 A1    Oct. 9, 2014

Related U.S. Application Data

(63) Continuation of application No. PCT/JP2012/080673, filed on Nov. 28, 2012.

(30) Foreign Application Priority Data

Dec. 27, 2011    (JP) ................. 2011-286787

(51) Int. Cl.
| | |
|---|---|
| *G02B 6/02* | (2006.01) |
| *G02B 6/44* | (2006.01) |
| *C03C 25/10* | (2006.01) |
| *C03C 25/28* | (2006.01) |

(52) U.S. Cl.
CPC ........ *G02B 6/02395* (2013.01); *C03C 25/1065* (2013.01); *C03C 25/285* (2013.01); *G02B 6/4403* (2013.01); *G02B 6/4409* (2013.01)

(58) Field of Classification Search
CPC ............... G02B 6/4403; G02B 6/4409; G02B 6/02395; C03C 25/285; C03C 25/1065
USPC .................................................. 385/114, 128
See application file for complete search history.

(56) References Cited

U.S. PATENT DOCUMENTS

| | | | |
|---|---|---|---|
| 7,085,465 | B2 | 8/2006 | Ono et al. |
| 7,209,614 | B2 | 4/2007 | Tanaka et al. |
| 7,551,825 | B2 | 6/2009 | Nakajima et al. |
| 7,555,183 | B2 | 6/2009 | Arashitani et al. |
| 7,729,564 | B2 | 6/2010 | Nakajima et al. |
| 7,876,991 | B2 | 1/2011 | Nakajima et al. |
| 7,978,948 | B2 | 7/2011 | Nakajima et al. |
| 8,111,964 | B2 | 2/2012 | Nakajima et al. |

(Continued)

FOREIGN PATENT DOCUMENTS

WO    WO 2008/012926 A1    1/2008

OTHER PUBLICATIONS

International Search Report mailed Jan. 8, 2013 for PCT/JP2012/080673 filed Nov. 28, 2012 with English Translation.

*Primary Examiner* — Akm Enayet Ullah

(74) *Attorney, Agent, or Firm* — Oblon, McClelland, Maier & Neustadt, L.L.P.

(57) ABSTRACT

A colored optical fiber including a glass optical fiber; a primary coating layer that covers the glass optical fiber; a secondary coating layer that covers the primary coating layer; and a colored layer that coats the secondary coating layer. The relaxation modulus after 24 hours at 60° C. of of the layers coated is 140 MPa or less.

1 Claim, 4 Drawing Sheets

(56) References Cited

U.S. PATENT DOCUMENTS

| | | |
|---|---|---|
| 8,295,666 B2 | 10/2012 | Nakajima et al. |
| 8,571,372 B2 | 10/2013 | Nakajima et al. |
| 8,639,077 B2 | 1/2014 | Tanaka et al. |
| 8,693,832 B2 | 4/2014 | Nakamura et al. |
| 8,731,365 B1 | 5/2014 | Nakajima et al. |
| 2008/0212925 A1 | 9/2008 | Arashitani et al. |
| 2009/0052847 A1 | 2/2009 | Arashitani et al. |
| 2009/0123749 A1 | 5/2009 | Ui et al. |
| 2010/0266257 A1 | 10/2010 | Nakajima et al. |
| 2011/0059236 A1 | 3/2011 | Ui et al. |
| 2012/0189257 A1 | 7/2012 | Kasahara et al. |
| 2013/0315545 A1 | 11/2013 | Saito et al. |
| 2014/0226941 A1* | 8/2014 | Tanaka et al. .............. 385/114 |

* cited by examiner

COLORED OPTICAL FIBER, OPTICAL FIBER RIBBON AND OPTICAL FIBER CABLE, USING COLORED OPTICAL FIBER

CROSS-REFERENCE TO RELATED APPLICATIONS

This application is a continuation of PCT/JP2012/080673 filed on Nov. 28, 2012 which claims benefit of Japanese Patent Application No. 2011-286787 filed on Dec. 27, 2011, the subject matters of which are incorporated herein by reference in their entirety.

FIELD OF THE INVENTION

The present invention relates to a colored optical fiber, an optical fiber ribbon, and an optical fiber cable using the same.

BACKGROUND OF THE INVENTION

An optical communication technique has been required to strictly control a dispersion characteristics and long-term reliability for meeting the demand of increased communication capacity primarily needed by a wavelength division multiplexing in recent years. For this reason, an optical fiber cable has also been required to control a polarization-mode dispersion characteristics, or the increase of transmission loss on the occasion of use in a high temperature high humidity environment.

An optical fiber undergoes an increase in the transmission loss due to the microbending generated by various external stresses. Therefore, in order to protect an optical fiber from external stresses, the optical fiber is generally provided with a coating having a double layer structure composed of a soft layer and a hard layer. The inner layer that is brought into contact with a glass optical fiber is made into a buffer layer (hereinafter, referred to as a primary coating layer) by using a soft resin having a relatively low Young's modulus, and the outer layer is made into a protective layer (hereinafter, referred to as a secondary coating layer) by using a hard resin having a relatively high Young's modulus. In general, a resin having a Young's modulus of 0.3 Pa to 3 MPa is used for the primary coating layer, and a resin having a Young's modulus of 500 MPa to 2000 MPa is used for the secondary coating layer. For the primary coating layer and the secondary coating layer, for example, UV curable resins containing a urethane acrylate-based oligomer or an epoxy acrylate-based oligomer as a main component are used.

In a method of manufacturing an optical fiber, an optical fiber preform containing quartz glass as a main component is melted by heating in a fiber drawing furnace, and a glass optical fiber is drawn from the preform. Then, a liquid UV curable resin is applied to the drawn glass optical fiber using a coating die. Subsequently, the resultant optical fiber is irradiated with UV rays to cure the UV curable resin. As such, in the manufacturing step for an optical fiber, the circumference of the drawn glass optical fiber is immediately coated with a coating resin in order to prevent a decrease in the strength of the optical fiber. By such a method, the glass optical fiber is coated with the primary coating layer and the secondary coating layer, and thereby an optical fiber is manufactured.

Furthermore, in the subsequent step, the circumference of the optical fiber thus obtained is coated with a colored layer made of a colored resin, and thereby a colored optical fiber is manufactured. There are no particular limitations on the coloring of the colored layer, but for example, an UV curable resin added with a coloring agent is used.

In this description, such a glass optical fiber coated with a primary coating layer and a secondary coating layer is referred to as a coated optical fiber; a coated optical fiber whose circumference is further coated with a coating layer made of a colored resin is referred to as a colored optical fiber; furthermore, multiple colored optical fibers arranged parallel to each other in a plane and collectively covered with a ribbon resin are referred to as an optical fiber ribbon.

Regarding a method of suppressing the increase in the transmission loss for the case of using a coated optical fiber in a high temperature high humidity environment, Patent Document 1 discloses a method of setting the relaxation modulus of the secondary coating layer to 400 MPa or less.

An optical fiber ideally is to be completely round in cross section. However, in fact the cross section of the optical fiber includes all sorts of asymmetry such as the cladding surface shape of the optical fiber cross-section deviating from a complete circle and concentricity error. The asymmetry of the optical fiber induced by production facilities and production conditions, so that the asymmetry tends to caused to continue in the longitudinal direction as well as at a cross section of the optical fiber. The propagation of light through the optical fiber with non-circularity asymmetry produces a difference in propagation velocity between that of X and Y polarization mode to cause dispersion. This is known as a polarization-mode dispersion (PMD).

In regard to the polarization-mode dispersion of an optical fiber, in order to suppress this, there is known a method of preventing the asymmetry present in the optical fiber cross-section to continue in the longitudinal direction, by imparting predetermined spin to the optical fiber when drawing fiber from an optical fiber preform. Thereby, an optical fiber in which the velocity of the X polarization mode is approximately equalized with the propagation velocity of the Y polarization mode, and thus the polarization-mode dispersion is reduced, and a method for producing such optical fiber have been proposed. On the other hand, since the cross-section of an optical fiber ribbon is asymmetric in the thickness direction and the width direction, there is a problem that the stress applied to each optical fiber in the thickness direction is different from the stress in the width direction. Each optical fiber tend to have the polarization-mode dispersion increased due to the asymmetry in stress, and in optical fiber ribbons and optical fiber cables obtained by gathering optical fiber ribbons, the polarization-mode dispersion may be increased.

CITATION LIST

Patent Literatures

Patent Literature 1: WO 2008/012926

SUMMARY OF THE INVENTION

According to the present invention, there is provided the following means:

A colored optical fiber comprising a glass optical fiber; and a coating layers, wherein the coating layers includes a primary coating layer that covers the glass optical fiber; a secondary coating layer that covers the primary coating layer; and a colored layer that coats the secondary coating layer, the coating layers having a relaxation modulus after 24 hours at 60° C. of 140 MPa or less.

An optical fiber ribbon, comprising a plurality of the colored optical fibers according to the present invention arranged parallel to each other and collected using a ribbon resin.

An optical fiber cable using the optical fiber ribbon according to the present invention, comprising the colored optical fiber accommodated in the optical fiber cable, having a polarization-mode dispersion of 0.1 ps/√km or less.

Other and further objects, features and advantages of the invention will appear more fully from the following description, appropriately referring to the accompanying drawings.

MODE FOR CARRYING OUT THE INVENTION

The present invention relates to a colored optical fiber which can realize an optical fiber ribbon and an optical fiber cable, in which deterioration over years, particularly even if used in a high temperature high humidity environment, the increase of transmission loss is suppressed, and the polarization-mode dispersion is reduced.

A preferred embodiment of the colored optical fiber of the present invention will be described with reference to FIG. 1.

Figure 1:
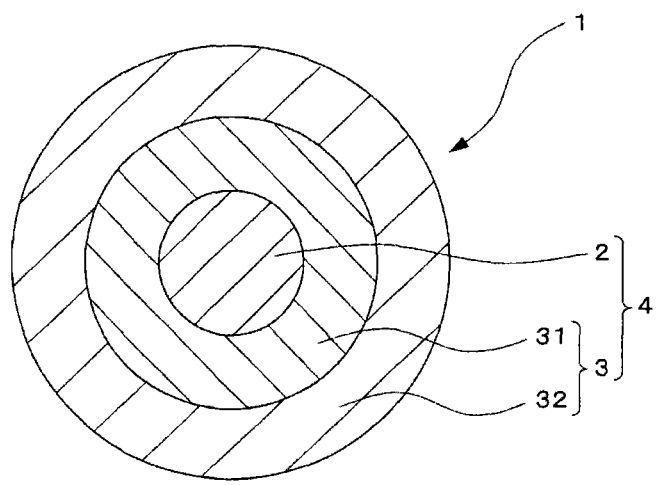
FIG. 1 is a cross-sectional view of a colored optical fiber according to preferred one embodiment of the present invention.
Figure 2:
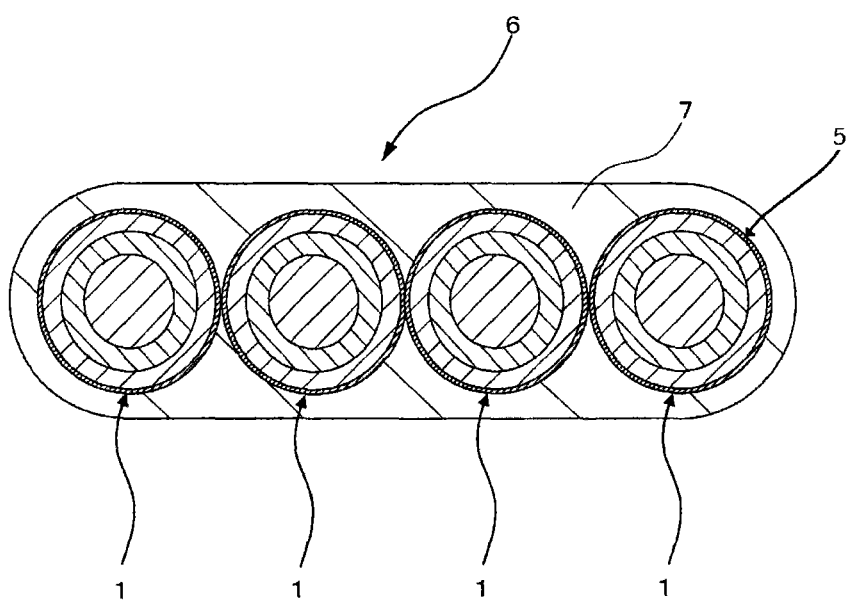
FIG. 2 is a cross-sectional view of an optical fiber ribbon according to preferred one embodiment of the present invention.

As illustrated in FIG. 1, a colored optical fiber 1 is a product in which optical fiber 4 obtained by coated a glass optical fiber 2 formed of quartz glass with at least two layers of coating layer 3, is further coated on the circumference with a colored layer 5 (FIG. 2). The outer diameter of the glass optical fiber 2 is usually 80 μm to 125 μm. The two layers of coating layer 3 is composed of a primary coating layer 31 and a secondary coating layer 32, and is both formed from UV curable resins. The UV curable resins each have a composition including an oligomer, a diluting monomer, a photoinitiator, a chain transfer agent, and additives. The outer diameter of the primary coating layer 31 is usually 120 μm to 200 μm, and the outer diameter of the secondary coating layer 32 is usually 165 μm to 245 μm. The colored layer 5 is not particularly limited, and one of the UV curable resin described above that has been colored by appropriately adding a colorant such as a pigment or a dye is used. The outer diameter of this colored layer 5 is usually 175 μm to 255 μm.

Examples of the UV curable resins described above include urethane acrylate-based resins, epoxy acrylate-based resins, polyester acrylate-based resins, and silicone acrylate-based resins.

The material used in the secondary coating layer 32 contains, for example, a polyether-based urethane acrylate having a double bond at either end as a main component. Furthermore, the material also has a reactive monomer similarly having a double bond at an end, a photoinitiator, an oxidation inhibitor, a stabilizer, a sensitizer, a lubricating agent, and the like added thereto.

The colored optical fiber of the present invention is such that the relaxation modulus, after 24 hours at 60° C., of the coating layer 3 is 140 MPa or less. The relaxation modulus can be adjusted by changing the kind or amount of addition of the oligomer or the monomer. For example, when an oligomer having a small molecular weight is used, or the proportion of urethane in the oligomer is increased, rigidity can be increased, and a high relaxation modulus can be obtained. Meanwhile, the relaxation modulus being high as used herein means that stress cannot be easily relieved in the course of stress reduction in viscoelasticity. Furthermore, regarding the monomer, the relaxation modulus can be adjusted by mixing a monofunctional monomer, a bifunctional monomer, and a polyfunctional monomer having a functionality of two or more, and adjusting the respective amounts. If there are many crosslinking points in the secondary coating layer 32, the relaxation modulus is increased. That is, when a polyfunctional monomer is used in a large amount, there is a tendency that the secondary coating layer 32 has a high relaxation modulus, and the stress cannot be easily relieved. In order to ameliorate the problem, the amount of addition of the bifunctional monomer or the polyfunctional monomer may be decreased.

Furthermore, increasing the amount of addition of the monofunctional monomer can also decrease the relaxation modulus.

Examples of the monofunctional monomer include PO-modified nonylphenol acrylate, isobornyl acrylate, 2-ethylhexyl acrylate, isononyl acrylate, isodecyl acrylate, polyethylene glycol acrylate, N-vinylpyrrolidone, and N-vinylcaprolactam.

Furthermore, examples of the bifunctional and polyfunctional monomers include 1,6-hexane diacrylate, bisphenol A epoxy acrylate, tripropylene glycol diacrylate, and tricyclodecane dimethylol diacrylate. Moreover, the above-described term "PO-modified" means that the compound has a block structure of propylene oxide unit (—$CH_2$—$CH(CH_3)$—O—).

The relaxation modulus described above is measured using a tube sample obtained by pulling out the glass optical fiber 2 from the colored optical fiber 1. The relaxation modulus is calculated by converting the stress responding while applying plural frequencies to this tube sample, by temperature time conversion. The details of this measurement method will be described below.

Next, a preferred embodiment of the optical fiber ribbon of the present invention will be described with reference to FIG. 2.

As illustrated in FIG. 2, an optical fiber ribbon 6 has a configuration in which four pieces of the colored optical fiber 1 described above are arranged in parallel to each other in a planar manner, and the colored optical fibers are altogether covered with a ribbon resin 7 formed of an UV curable resin. Regarding the optical fiber ribbon 6, for example, one having a dimension of 1.045±0.015 mm in width and 0.275 mm±0.015 mm in height is employed; however, this size is not intended to be limitative and is appropriately determined. Furthermore, the number of the colored optical fiber 1 that constitutes the optical fiber ribbon 6 is also not limitative to four, and various numbers such as two, eight, and twelve are appropriately employed.

Regarding the ribbon resin 7, an UV curable resin is used, and for example, the same material as that for the secondary coating layer described above is used. Also, from the viewpoints of decreasing the PMD and suppressing scratching at the time of assembling, it is preferable to select a resin having a Young's modulus of 700 MPa to 1500 MPa.

This optical fiber ribbon 6 is such that the relaxation modulus, after 24 hours at 60° C., of the coating layer for the colored optical fiber 1 is 140 MPa or less, and the increase of the transmission loss of the optical fiber ribbon 6 after it is immersed in hot water at 60° C. for 90 days is less than 0.1 dB/km.

Figure 3:
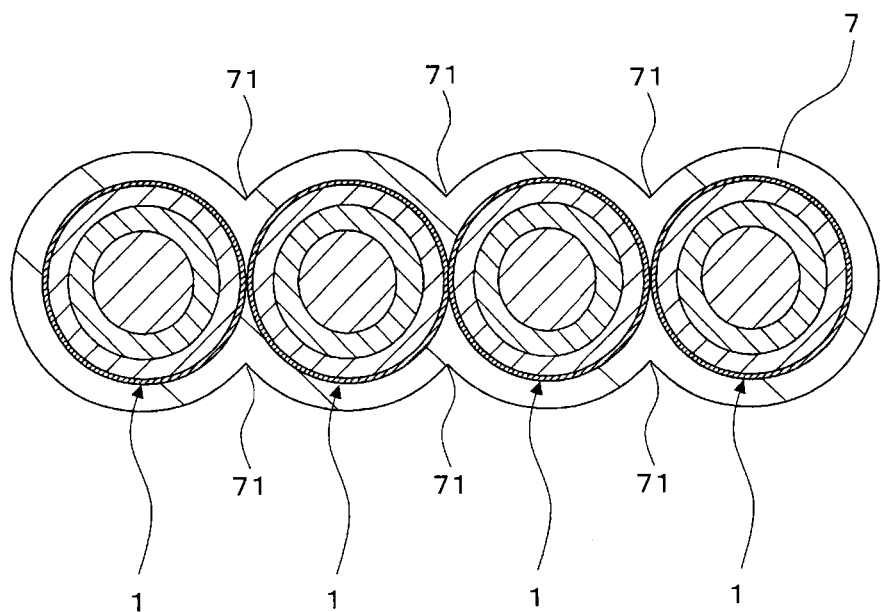
FIG. 3 is a cross-sectional view illustrating a modification example of the embodiment of the optical fiber ribbon illustrated in FIG. 2.

Moreover, the optical fiber ribbon 6 may also be produced into a type having grooves 71 on the circumference by coating the ribbon resin 7 along the circumferences of each colored optical fiber 1, as illustrated in FIG. 3.

Next, a preferred embodiment of the optical fiber cable 8 of the present invention will be described with reference to FIG. 4.

Figure 4:
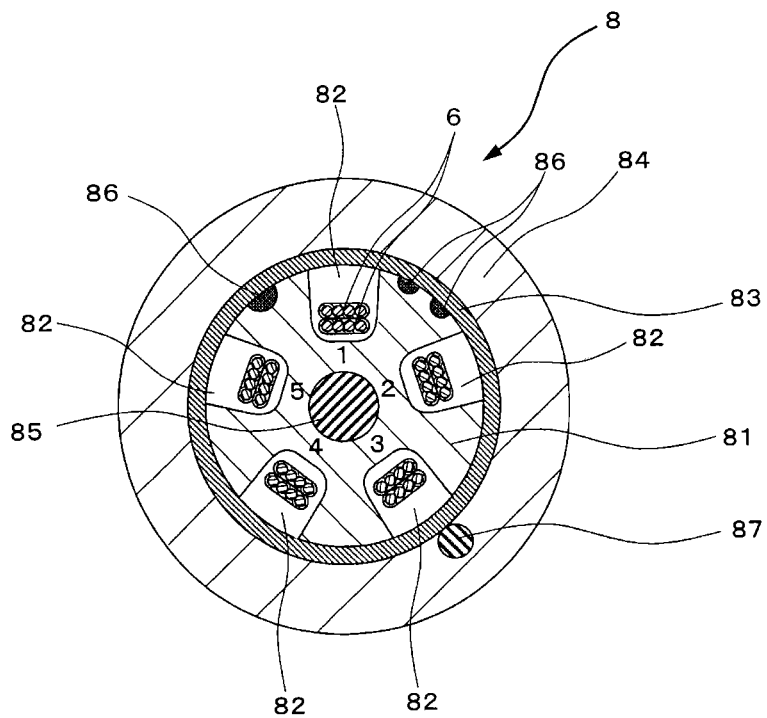
FIG. 4 is a cross-sectional view of an optical fiber cable according to preferred one embodiment of the present invention.

As illustrated in FIG. 4, an optical fiber cable 8 is, for example, an SZ cable with 40 fibers, and has a configuration in which two each of the optical fiber ribbon 6 are respectively dropped into an SZ slot 82 of a spacer 81 having five grooves, the spacer is wound with a pressing-wrapping tape 83, and the optical fiber cable is covered with a sheath 84. Also, at the center of the cross-section of the spacer 81, a tension member 85 is provided. Provided along the circumference of the spacer 81 is a tracer mark 86, and a tearing string 87 is provided at a part of the circumference of the pressing-wrapping tape 83.

The SZ slot 82 may have, for example, a reversal of 290±30°, a reversal pitch of 150±20 mm, and an outer diameter of 6.5 mm; but, the size is not limitative to these values and can be appropriately selected. Furthermore, the SZ slot 82 is not intended to be limited to the type having five grooves, and the number of grooves can be appropriately selected. Moreover, the number of the optical fiber ribbons 6 in the SZ slot 82 is not intended to be limited to two, and the number can be appropriately selected. Further, in the optical fiber cable 8 described above, the polarization-mode dispersion characteristics of the colored optical fiber 1 in the state of being accommodated in the optical fiber cable 8 is 0.1 ps/√km or less.

According to the colored optical fiber 1 described above, the relaxation modulus after 24 hours at 60° C. is 140 MPa or less, and even if the colored optical fiber is used in a high temperature and high humidity environment, the stress occurring at the interface between the glass optical fiber 2 and the primary coating layer 31 can be suppressed to a low level, so that the transmission loss is not likely to be increased.

Moreover, the high temperature high humidity as used in the present invention means 30° C. to 70° C. and a relative humidity of 80% to 100% in consideration of the use environment of cables.

Furthermore, when the colored optical fiber 1 described above is used, the optical fiber ribbon 6 and the optical fiber cable 8 which do not easily undergo an increase in the transmission loss even if used in a high temperature high humidity environment, can be constructed. Furthermore, the polarization-mode dispersion characteristics of the colored optical fiber 1 in the state of being accommodated in the optical fiber cable 8 can be reduced to 0.1 ps/√km or less.

EXAMPLES

Hereinafter, the present invention will be described by way of Examples of the optical fiber ribbon 6 using the colored optical fiber 1, and the optical fiber cable 8 explained in the embodiments described above, but the present invention is not intended to be limited to the following examples.

Colored optical fibers 1 having the relaxation modulus varied by changing the kind or amount of incorporation of the material that constituted the coating layer in the colored optical fibers 1 such as described above, were obtained. Optical fiber ribbons 6 and optical fiber cables 8 were produced using these, and after the optical fiber ribbon and the cables were immersed in hot water at 60° C. for 90 days, the increases of the transmission loss were measured. Furthermore, the polarization-mode dispersion characteristics of the colored optical fibers 1 in the state of being accommodated in optical fiber cables were measured.

Next, the method for measuring the relaxation modulus, the method for hot water testing at 60° C. for 90 days, and the method for measuring the polarization-mode dispersion characteristics after optical fiber cable production will be respectively explained.

(Method for Measuring Relaxation Modulus)

For the measurement of the relaxation modulus, a dynamic viscoelasticity testing apparatus (RSAIII (trade name) manufactured by TA Instruments, Inc.) was used. This method is a method of performing measurement utilizes a fact that a molecular motion increases remarkably and a modulus of elasticity changes a lot in a glass transition region. That is, this method utilizes a fact that a modulus of elasticity of a resin changes a lot from about 1,000 MPa to about 1 MPa, that is, by three digits by a state transferring to a rubbery state from a glassy state.

Specifically, first, the dynamic viscoelasticity is determined by applying periodic strain to a tube coating sample formed only of the coating, with the glass optical fiber having been pulled out, and measuring the responsive stress against the strain. At the same time, the difference of phase between the input distortions and the responsive stress is measured. If the coating sample is a perfect elastic material, the response to strain occurs not slowly. However, if there is present a viscoelasticity factor, a delay occurs in the response. That delay is manifested as the loss tangent value, tan δ.

By measuring the dynamic viscoelasticity, data of a storage Young's modulus (E'), a loss Young's modulus (E"), and a loss tangent value (tan δ=E"/E') can be obtained.

Herein, the storage Young's modulus expresses an elastic component of a substance and the loss Young's modulus expresses a viscosity component of the substance, and the loss tangent value is a value obtained by dividing the loss Young's modulus by the storage Young's modulus, and expresses a balance between the elastic component and viscosity component.

Figure 5:
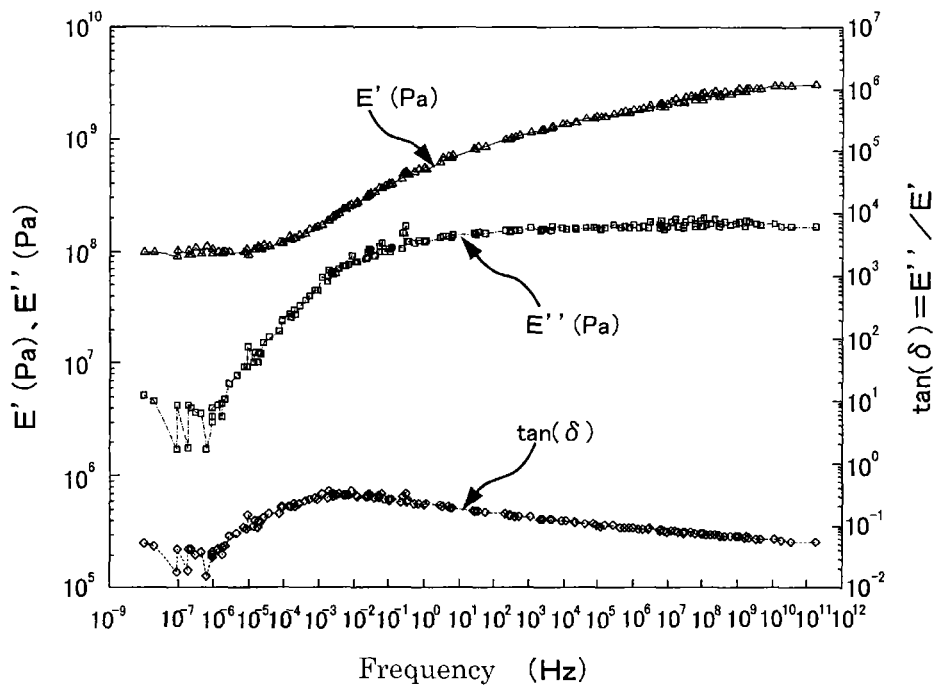
FIG. 5 is a relationship diagram illustrating the relationship of the storage Young's modulus (E'), the loss Young's modulus (E") and the loss tangent value (tan δ)=E"/E', with frequency.
Figure 6:
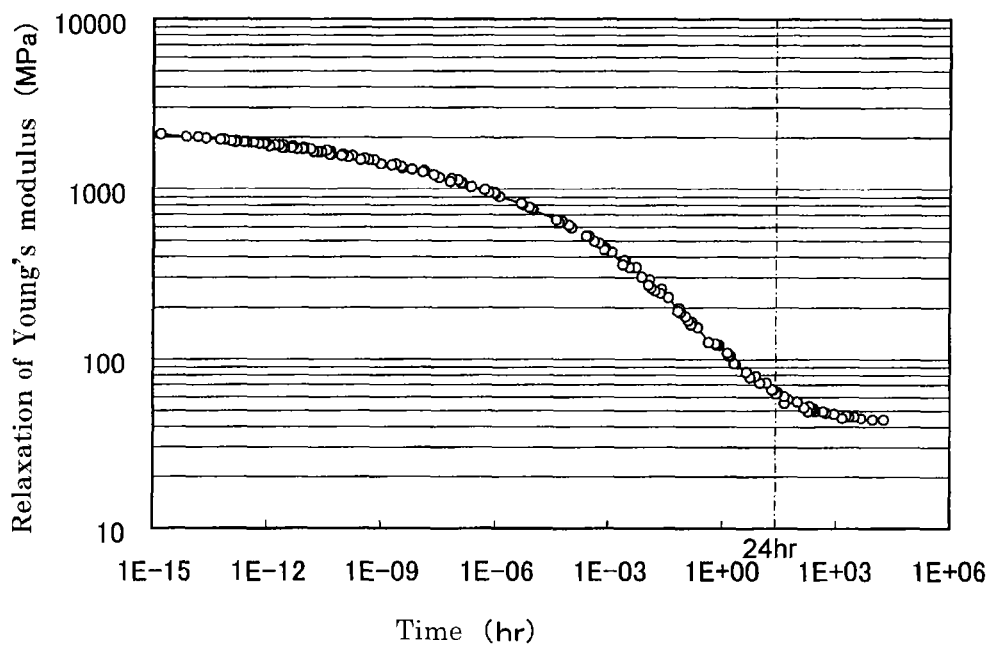
FIG. 6 is a relationship diagram illustrating the relationship between the relaxation modulus and the time stood at 60° C.

As one of examples of the measurement results, the measurement results for Example 2 are illustrated in FIG. 5. FIG. 5 shows master curves produced for this Example. Firstly, Time-Temperature-Superposition [TTS] is applied to the values of storage Young's modulus (E'), loss Young's modulus (E") and loss tangent value (tan δ) measured at various temperature. Then, based on the viscoelastic data measured with changing temperatures and frequencies at 60° C. as a base temperature by using WLF (Williams, Landel and Ferry) equation, a shift factor Log (aT) which indicates a relationship between the amount of horizontal movement and the temperature change is defined. The frequency on the horizontal axis of this master curve was converted to time, and thus the relaxation of Young's modulus were calculated. The results are shown in FIG. 6. Meanwhile, a master curve produced dynamically over a wide range of temperature and frequency enables calculation of the relaxation of Young's modulus extending from a short time to a long time. By using this measurement method, even when there is a change in temperature, relaxation of Young's modulus can be calculated using the shift factor.

The reason for employing the relaxation modulus after 24 hours at 60° C. is that the process of cooling after sheathing at the time of optical fiber cable production was contemplated. Thus in fact, a good correlation for the relaxation modulus after 24 hours at 60° C. and the PMD can be obtained.

The relaxation modulus of the optical fiber 4 is defined as the relaxation modulus of the coating layer 3 that is composed of the primary coating layer 31 and the secondary coating layer 32. Furthermore, the relaxation modulus of the colored optical fiber 1 is defined as the relaxation modulus of the coating layer 9 that is composed of the primary coating layer 31, the secondary coating layer 32 and the colored layer 5. In order to measure the relaxation modulus, the optical fiber 4 was immersed in liquid nitrogen, subsequently the glass optical fiber 2 was pulled out, and thereby the coating layer 3 in which the primary coating layer 31 and the secondary coating layer 32 were integrated (tube coating sample), was obtained. Then, this tube coating sample was fixed to tension type jigs, and the storage Young's modulus (E'), the loss Young's modulus (E') and the loss tangent value (tan δ) were measured under the measurement conditions described below. The relaxation modulus of the colored optical fiber 1 was measured using a tube coating sample composed of the coating layer 9 that also includes the colored layer 5.

The measurement conditions were set to a temperature range of −20° C. to 170° C., and the response to strain during a temperature increasing process was measured while a static load was continuously applied in the tension direction at a step of 5° C., under 5 kinds of angular frequencies ω=0.31, 0.62, 3.14, 6.28, and 31.4 rad/sec (frequency 0.05 Hz to 5 Hz), with an amount of strain of 0.5 to 0.7. Moreover, these conditions were selected because if the frequency or the amount of strain is too high, the tube coating sample undergoes breakage.

(Hot Water Testing Method)

An optical fiber ribbon 6 having a length of about 1 km, which was produced using the colored optical fiber 1, was immersed in hot water at 60° C., and the transmission losses after a lapse of 30 days and after a lapse of 90 days were measured. Moreover, the reason why the temperature was set to 60° C. and the number of days to 30 days and 90 days, is that an increase in the transmission loss occurs approximately in 30 days, and thereafter, the transmission loss is saturated after a lapse of 90 days. The measurement of the transmission loss was carried out by measuring the transmission loss at a wavelength of 1550 nm in the longitudinal direction, based on the coefficient of light backscatter loss using a light pulse testing machine (OTDR): MW9076B (trade name) manufactured by Anritsu Corp. Then, the water temperature was raised to 60° C., the optical fiber ribbon was immersed therein for 90 days, and then when it was observed that the increase of the transmission loss was less than 0.05 dB/km, it was evaluated that the optical fiber ribbon had sufficient resistance to the environment for its use. The results were indicated as "A" in Table 1. Furthermore, when it was observed that the increase of the transmission loss was greater than or equal to 0.05 dB/km and less than 0.1 dB/km, it was evaluated that the optical fiber ribbon had resistance to the environment for its use. The results were indicated as "B" in Table 1. On the other hand, when it was observed that the increase of the transmission loss was increased to 0.1 dB/km or greater, it was evaluated that the optical fiber ribbon had no resistance to the environment for its use. The results were indicated as "C" in Table 1.

(Measurement of Polarization-Mode Dispersion Characteristics)

The measurement of the polarization-mode dispersion was carried out after producing a cable by dropping optical fiber ribbons 6 into the slots for optical fiber cable, wrapping the circumference with a pressing-wrapping tape, and winding the wrapped optical fiber ribbons around a drum having a diameter of 800 cm (before sheathing), and producing an optical fiber cable by further covering the circumference thereof with a sheath. For the measurement, the Jones matrix method was used. Moreover, the measurement was carried out for four colored optical fiber 1 that constituted the optical fiber ribbon dropped to the lowest bottom of arbitrary grooves. Also, for the optical fiber ribbon, since the polarization-mode dispersion of the two colored optical fibers at the center tends to increase as compared with that of the two colored optical fibers at both ends, the average of the two at the center (optical fibers No. 2 and No. 3) was designated as the polarization-mode dispersion value.

Furthermore, in order to cope with the capacity enlargement in communication by wavelength division multiplexing, the polarization-mode dispersion value is desiced to be 0.1 ps/√km or less. Therefore, when it was observed that the polarization-mode dispersion value was 0.1 ps/√km or less, the results were designated as "A" in Table 1. On the other hand, when it was observed that the polarization-mode dispersion value was greater than 0.1 ps/√km, the results were designated as "C" in Table 1.

Examples 1 to 6

For the test specimen of Example 1, as illustrated in FIG. 1, a coated optical fiber was produced by forming a primary coating layer 31 having an outer diameter of 195 μm and a Young's modulus of 0.6 MPa on the circumference of a glass coated optical fiber 2 formed of quartz glass and having an outer diameter of 125 μm; and forming a secondary coating layer 32 having an outer diameter of 243 μm and a Young's modulus of 830 MPa on the circumference of the primary coating layer 31. Furthermore, a colored layer 5 was formed on the circumference of the secondary coating layer 32, and thus a colored optical fiber 1 having a three-layered coating structure having an outer diameter of 255 μm was produced. The primary coating layer 31 was produced using an UV curable resin that used urethane acrylate, and the secondary coating layer 32 was produced using an UV curable resin containing 2-ethylhexyl acrylate as a monomer. Also, in the colored layer 5, an UV curable resin was used as a colorant. Furthermore, as illustrated in FIG. 2 or FIG. 3, four of the colored optical fiber 1 were arranged in parallel in a planar manner, and the optical fibers were altogether covered with a ribbon resin 7 formed of an UV curable resin. Thus, an optical fiber ribbon 6 having four colored optical fibers at the center and with a thickness of about 0.32 mm and a width of about 1.1 mm was produced. Furthermore, as illustrated in FIG. 4 described above, two each of the optical fiber ribbons 6 described above were dropped into a SZ slot 82 having five grooves, the optical fiber ribbons were wound with a pressing-wrapping tape 83 and covered with a sheath 84. Thus, a 40-fiber SZ cable was obtained. For the SZ slot 82, one having a reversal of 290±30°, a reversal pitch of 150 ±20 mm, and an outer diameter of 6.5 mm was used.

The test specimen of Example 2 was produced in the same manner as in Example 1, except that the Young's modulus of the primary coating layer 31 was adjusted to 0.7 MPa, the Young's modulus of the secondary coating layer 32 was adjusted to 850 MPa.

The test specimen of Example 3 was produced in the same manner as in Example 1, except that the Young's modulus of the secondary coating layer 32 was adjusted to 900 MPa.

The test specimen of Example 4 was produced in the same manner as in Example 1, except that the Young's modulus of the primary coating layer 31 was adjusted to 0.5 MPa, the Young's modulus of the secondary coating layer 32 was adjusted to 700 MPa, and the outer diameter was adjusted to 185 μm.

The test specimen of Example 5 was produced in the same manner as in Example 1, except that the Young's modulus of the secondary coating layer 32 was adjusted to 950 MPa.

The test specimen of Example 6 was produced in the same manner as in Example 1, except that the Young's modulus of the primary coating layer 31 was adjusted to 0.7 MPa, the Young's modulus of the secondary coating layer 32 was adjusted to 900 MPa.

Comparative Examples 1 and 2

The test specimen of Comparative Example 1 was produced in the same manner as in Example 1, except that the Young's modulus of the secondary coating layer 32 was adjusted to 1050 MPa, and the outer diameter was adjusted to 185 μm.

The test specimen of Comparative Example 2 was produced in the same manner as in Example 1, except that the Young's modulus of the secondary coating layer 32 was adjusted to 950 MPa, and the outer diameter was adjusted to 185 μm.

These were subjected to the measurement of the relaxation modulus of the optical fiber 4, the relaxation modulus of the colored optical fiber 1, the increases of the transmission loss by a hot water test after immersion for 30 days and after immersion for 90 days of the optical fiber ribbon 6 in hot water at 60° C., and the polarization-mode dispersion characteristics before and after sheathing of the colored optical fiber 1 and the optical fiber cable 8, according to the above method. The results are shown in Table 1.

As is apparent from the results shown in Table 1, the respective test specimens of Examples 1 to 6 were such that the relaxation modulus after 24 hours at 60° C. of the coating layer of the colored optical fiber 1 described above was 140 MPa or less; the transmission loss did not increase even after the optical fiber ribbon 6 using the colored optical fiber 1 was immersed in hot water at 60° C. for 30 days; and the transmission loss was less than 0.1 dB/km even after the ribbon was immersed in hot water at 60° C. for 90 days. Furthermore, the polarization-mode dispersion characteristics of the optical fiber cable (after sheathing) was suppressed to 0.1 ps/√km or less.

Moreover, when the relaxation modulus described above is 42 MPa or less, as there is a possibility that there may be adverse effects of lateral pressure characteristics, the relaxation modulus is preferably greater than 42 MPa.

On the other hand, Comparative Example 1 was such that the relaxation modulus of the colored optical fiber 1 was 208 MPa, larger than 140 MPa; when the optical fiber ribbon 6 using this colored optical fiber 1 was immersed in hot water at 60° C. for 30 days, the increase of the transmission loss reached 0.1 dB/km; and in hot water at 60° C. for 90 days, the increase of the transmission loss reached 0.26 dB/km. Furthermore, the polarization-mode dispersion characteristics of the optical fiber cable (after sheathing) exceeded 0.1 ps/√km, and reached 0.126 ps/√km.

Comparative Example 2 was such that the relaxation modulus of the colored optical fiber was 160 MPa, larger than 140 MPa; when the optical fiber ribbon 6 using this colored optical fiber 1 was immersed in hot water at 60° C., the increase of the transmission loss reached 0.07 dB/km in 30 days. When the optical fiber was immersed in hot water at 60° C. for 90 days, the increase of the transmission loss reached 0.19 dB/km. Furthermore, the polarization-mode dispersion characteristics of the optical fiber cable (after sheathing) exceeded 0.1 ps/√km, and reached 0.114 ps/√km.

Figure 7:
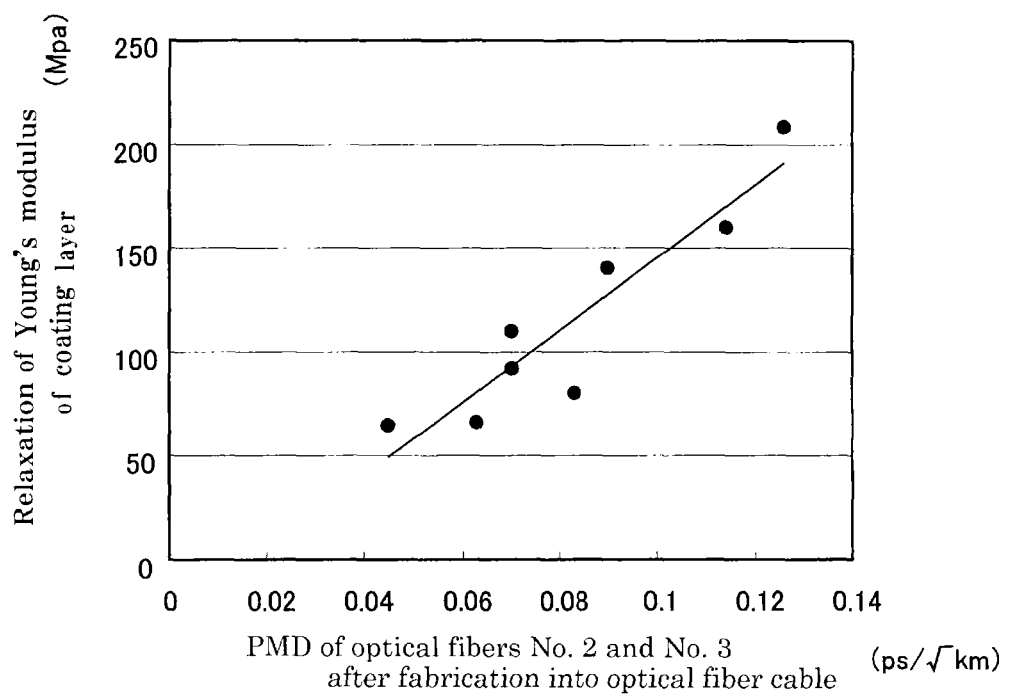
FIG. 7 is a relationship diagram illustrating the relationship between the secondary coating layer and the polarization-mode dispersion (PMD) for the colored optical fiber No. 2 and No. 3 fabricated into the optical fiber ribbons and cables.

FIG. 7 is a graph which shows the relationship between the average values of the polarization-mode dispersion characteristics of the optical fibers No. 2 and No. 3 after fabrication into an optical fiber cable (after sheathing), and the relaxation modulus of the colored optical fiber.

TABLE 1

| | Ex 1 | Ex 2 | Ex 3 | Ex 4 | Ex 5 | Ex 6 | C Ex 1 | C Ex 2 |
|---|---|---|---|---|---|---|---|---|
| Young's modulus of primary coating layer (MPa) | 0.6 | 0.7 | 0.6 | 0.5 | 0.6 | 0.7 | 0.6 | 0.6 |
| Young's modulus of secondary coating layer (MPa) | 830 | 850 | 900 | 700 | 950 | 900 | 1050 | 950 |
| Outer diameter of primary coating layer (μm) | 195 | 195 | 195 | 185 | 195 | 195 | 185 | 185 |
| Relaxation modulus of optical fiber (MPa) 60° C. × after 24 hrs | 48 | 55 | 56 | 55 | 42 | 68 | 190 | 68 |
| Relaxation modulus of colored coated fiber (MPa) 60° C. × after 24 hrs | 66 | 80 | 64 | 110 | 92 | 140 | 208 | 160 |
| Increase of transmission loss in hot water of ribbon (dB/km) 60° C. × 30 days, 1550 nm | 0.00 | 0.00 | 0.00 | 0.00 | 0.00 | 0.04 | 0.10 | 0.07 |
| Increase of transmission loss in hot water of ribbon (dB/km) 60° C. × 90 days, 1550 nm | 0.02 | 0.02 | 0.01 | 0.03 | 0.02 | 0.09 | 0.26 | 0.19 |
| Evaluation of transmission loss in hot water | A | A | A | A | A | B | C | C |
| Before sheathing optical fiber PMD (ps/√km) of optical fibers No. 2 and No. 3 | 0.035 | 0.040 | 0.026 | 0.036 | 0.059 | 0.040 | 0.017 | 0.048 |
| After sheathing optical fiber PMD (ps/√km) of optical fibers No. 2 and No. 3 | 0.063 | 0.083 | 0.045 | 0.070 | 0.070 | 0.090 | 0.126 | 0.114 |
| Evaluation of PMD | A | A | A | A | A | A | C | C |

"Ex" means Example according to this invention, and
"C Ex" means Comparative Example.

As is shown in FIG. 7, there is a correlation between the relaxation modulus of the colored optical fiber and the polarization-mode dispersion characteristics of the optical fibers No. 2 and No. 3 after fabrication into optical fiber cable (after sheathing). When the relaxation modulus of the colored optical fiber is adjusted to 140 MPa or less, the polarization-mode dispersion characteristics of the colored optical fiber in the state of accommodated in the optical fiber cable can be adjusted to 0.1 ps/√ km or less.

As described above, when the relaxation modulus of the coating layer of the colored optical fiber 1 is 140 MPa or less, the increase of the transmission loss in the case of immersing the optical fiber ribbon using the colored optical fiber in hot water at 60° C. for 90 days can be adjusted to less than 0.1 dB/km. Furthermore, the polarization-mode dispersion characteristics of the optical fiber cable using the optical fiber ribbon can be adjusted to 0.1 ps/√ km or less.

Having described our invention as related to this embodiments, it is our intention that the invention not be limited by any of the details of the description, unless otherwise specified, but rather be construed broadly within its spirit and scope as set out in the accompanying claims.

DESCRIPTION OF SYMBOLS

1 Colored optical fiber
2 Glass optical fiber
3 Coating layer
4 Optical fiber
5 Colored layer
6 Optical fiber ribbon
7 Ribbon resin
8 Optical fiber cable
31 Primary coating layer
32 Secondary coating layer

The invention claimed is:

1. An optical fiber cable, comprising:
   an optical fiber ribbon including a plurality of colored optical fibers that are arranged parallel to each other and are collected using a ribbon resin, the colored optical fibers each including:
      a glass optical fiber, and
      a coating layer, the coating layer including:
         a primary coating layer that covers the glass optical fiber,
         a secondary coating layer that covers the primary coating layer, and
         a colored layer that coats the secondary coating layer, and wherein
      the coating layers that are composed of the primary coating layer, the secondary coating layer, and the colored layer included a relaxation modulus after 24 hours at 60° C. of 140 MPa or less, wherein
   an increase of transmission loss of the optical fiber ribbon after being immersed in hot water at 60° C. for 90 days is less than 0.1 dB/km, and
   each of the colored optical fibers accommodated in the optical fiber cable includes a polarization-mode dispersion of 0.1 ps/√ km or less.

* * * * *